United States Patent
Hanna et al.

(10) Patent No.: US 6,218,061 B1
(45) Date of Patent: Apr. 17, 2001

(54) FERROELECTRIC CHARGE-TRANSPORT LIQUID CRYSTAL MATERIAL

(75) Inventors: Junichi Hanna, Yokohama; Kyoko Kogo, Shinjuku-Ku; Toshio Yoshihara, Shinjuku-Ku; Hiroki Maeda, Shinjuku-Ku, all of (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/352,869

(22) Filed: Jul. 13, 1999

(30) Foreign Application Priority Data

Jul. 13, 1998 (JP) .................................................. 10-197481
Mar. 25, 1999 (JP) .................................................. 11-082046

(51) Int. Cl.$^7$ .......................... G03G 5/047; C09K 19/34
(52) U.S. Cl. .......................... 430/58.05; 430/20; 347/55; 365/110; 428/1.4; 428/913
(58) Field of Search .................. 430/20, 37, 58.05; 347/55; 365/110, 112; 428/1.4, 913

(56) References Cited

U.S. PATENT DOCUMENTS 5,637,256    6/1997   Walba et al. .................... 252/299.66
5,903,296  * 5/1999   Shimizu et al. ........................ 347/139
5,980,779  * 11/1999  Hanna et al. .................... 252/299.62

FOREIGN PATENT DOCUMENTS 0 763 532 A2   3/1997   (EP) .

OTHER PUBLICATIONS

Schadt et al., "Nonlinear optical ferroelectric liquid crystals and device configurations", Dec. 1994, *Applied Physics B: Lasers and Optics*, No. 6 pp. 607–615.

* cited by examiner

*Primary Examiner*—John Goodrow
(74) *Attorney, Agent, or Firm*—Parkhurst & Wendel, L.L.P.

(57) ABSTRACT

There is provided a ferroelectric charge-transport liquid crystal material comprising a liquid crystal compound, the liquid crystal material having a carrier mobility of not less than $10^{-5}$ cm$^2$/Vs.

There are further provided an image display device, an electroluminescence device, a photoconductor, a space light modulating device, a thin-film transistor, a photosensor, and a photorefractive device each comprising the ferroelectric charge-transport liquid crystal material.

11 Claims, 6 Drawing Sheets

FERROELECTRIC CHARGE-TRANSPORT LIQUID CRYSTAL MATERIAL

BACKGROUND OF THE INVENTION

1. Field of the Invention

The present invention relates to a liquid crystal material, and more particularly to a ferroelectric charge-transport liquid crystal material, that exhibits ferroelectric liquid crystallinity and, in addition, charge-transport properties, and various elements or devices using the material.

2. Background Art

Liquid crystal materials having various structures are known in the art, and have been widely used mainly as materials for information display devices using electro-optic effect based on the alignment effect of liquid crystal molecules attained by application of voltage. Further, application of liquid crystal materials to optical shutters, optical stops, modulating devices, lenses, light beam deflection/optical switches, phase diffraction gratings, optical logic devices, memory devices and the like are under study.

External stimulation by heat, electric field, magnetic field, pressure or the like results in transition of the alignment of liquid crystal molecules which enables optical properties, electric capacity and the like of the liquid crystal to be easily changed. Sensors and measuring instruments, utilizing these properties, for temperature, electric field/voltage, infrared radiation, ultrasonic wave, flow rate/acceleration, gas or pressure have been studied in the art.

Charge-transport materials, wherein charge-transport molecules which serves as a charge-transport site are dissolved or dispersed in a matrix material, such as a polycarbonate resin, or charge-transport materials, wherein a charge-transport molecule structure pendent on a polymer main chain, such as polyvinyl carbazole, are known in the art. These materials have been extensively used as materials for photoreceptors in copying machines, printers and the like.

When the conventional charge-transport materials are dispersive charge-transport materials, what is desired for improving the charge-transport capability is high solubility of charge-transport molecules in polymers as the matrix. In fact, however, a high concentration of the charge-transport molecule in the matrix causes crystallization of the charge-transport molecule, and, hence, the upper limit of the concentration of the charge-transport molecule in the matrix is generally 20 to 50% by weight, although it depends upon the type of the charge-transport molecule. This concentration means that not less than 50% by weight of the whole material is accounted for by the matrix not having the charge-transport properties. This concentration thus poses a problem because, in the form of films, the charge-transport properties and the response speed are restricted by the matrix and hence are unsatisfactory.

On the other hand, in the case of the pendant type charge-transport polymer, the proportion of the pendant having charge-transport properties is high. This polymer, however, involves many practical problems associated with mechanical strength, environmental friendliness and durability of the formed film, and film-forming properties. In this type of charge-transport material, the charge-transport pendants are locally present close to one another, and this portion, when charges are hopped, serves as a stable site and functions as a kind of trap, unfavorably resulting in lowered charge mobility.

All the above amorphous type charge-transport materials raise a problem that, unlike crystal materials, the hopping site fluctuates in terms of space, as well as in terms of energy. For this reason, the charge transport properties depend greatly upon the concentration of the charge-transport site, and the carrier mobility is generally about $1 \times 10^{-6}$ to $1 \times 10^{-5}$ cm$^2$/Vs which is much smaller than that of molecular crystals, 0.1 to 1 cm$^2$/vs. Further, the amorphous materials have an additional problem that the charge-transport properties depend greatly upon temperature and field strength.

This is greatly different from charge-transport crystal materials. Charge-transport polycrystalline materials are promising materials in applications where a charge-transport layer having a large area is necessary, because it can form an even charge-transport film having a large area. The polycrystalline materials, however, are inherently uneven from the microscopic viewpoint, and present problems including that defects formed in the interface of particles should be controlled.

Accordingly, it is an object of the invention to provide a novel charge-transfer material which can solve the problems of the prior art, that is, possesses both advantages of amorphous materials, structural flexibility and evenness over a large area, and advantages of the crystalline materials, molecular alignment, and at the same time can realize the control of charge-transport properties by an external field and possesses high level of charge-transport properties, thin-film forming properties, various fastness properties and the like.

According to one aspect of the present invention, there is provided a ferroelectric charge-transport liquid crystal material comprising a liquid crystal compound, said liquid crystal material having a carrier mobility of not less than $10^{-5}$ cm$^2$Vs, and applications thereof.

The ferroelectric charge-transport liquid crystal material of the present invention has a self-aligning property by virtue of the molecular structure. Therefore, unlike the molecule dispersed material, use thereof as a hopping site inhibits spatial and energetic dispersion of the hopping site and can realize band-like transport properties, that is, electron conduction, such as found in molecular crystals. As such, a larger mobility than that in the conventional molecule dispersed materials can be realized and the mobility does not depend upon the electric field. Further, by virtue of the self-polarization, the self-aligning properties can be controlled by an external field, and a change in property values as a result of the control of the self-aligning properties can also be controlled. That is, the ferroelectric charge-transport liquid crystal material has liquid crystallinity and at the same time can transport charges in response to visible light. Therefore, the ferroelectric charge-transport liquid crystal material is useful in the applications of the conventional liquid crystal, as well as in materials for applications utilizing charge-transport properties, such as photosensors, electroluminescence devices, photoconductors, space modulating devices, thin-film transistors, photorefractive devices, and other sensors. In particular, the ferroelectric charge-transport liquid crystal material according to the present invention has excellent sensitivity to visible light, and hence is useful as materials for photosensors.

Figure 1:
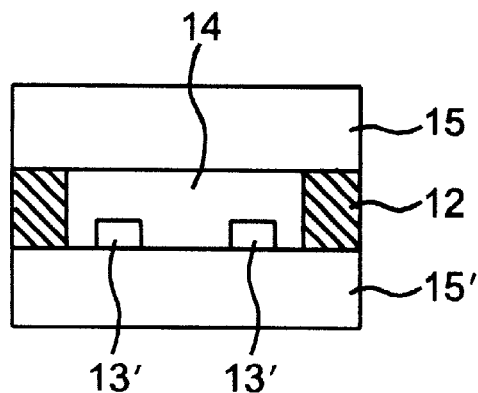
FIG. 1 is a schematic diagram of one embodiment of the photosensor according to the present invention.
Figure 2:
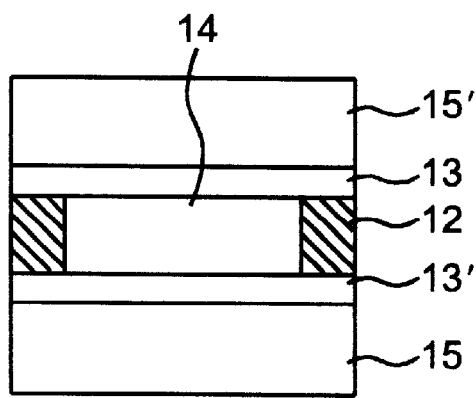
FIG. 2 is a schematic diagram of another embodiment of the photosensor according to the present invention.

In the drawings, numeral 11 denotes an information recording layer, numeral 12 a spacer, numeral 13 a transparent electrode, numeral 13' an electrode (counter electrode), numeral 14 a charge-transport layer, numeral 14' a charge generation layer, numeral 15 a transparent substrate, numeral 15' a substrate, numeral 16 a light-emitting layer, numeral 17 a protective layer, numeral 19 a spacer, numeral 20 a dielectric layer, numeral 21 a glass plate, numeral 22 a polarizing film, numeral 23 a liquid crystal layer, numeral 31 a gate electrode, numeral 32 a gate dielectric layer, numeral 33 a source electrode, and numeral 34 a drain electrode.

DESCRIPTION OF THE PREFERRED EMBODIMENTS

The present invention will be described in more detail with reference to the following preferred embodiments.

Liquid crystal compounds possessing charge-transport properties and ferroelectricity usable in the present invention have a carrier mobility of not less than $1 \times 10^{-5}$ cm$^2$/Vs and include those having an electron mobility of not less than $1 \times 10^{-5}$ cm$^2$/Vs, preferably not less than $1 \times 10^{-4}$ cm$^2$/Vs, and those having a hole mobility of not less than $1 \times 10^{-5}$ cm$^2$/Vs, preferably not less than $1 \times 10^{-4}$ cm$^2$/Vs. When the carrier mobility is less than $1 \times 10^{-5}$ cm$^2$/Vs, effective electron conduction cannot be obtained and, in this case, the conduction is governed by ion conduction. Preferably, the liquid crystal compound has (aromatic ring of 6π electron system)$_l$, (aromatic ring of 10π electron system)$_m$, and/or (aromatic ring of 14π electron system)$_n$ (wherein l+m+n=1 to 4 and l, m, and n each are an integer of 0 to 4) in the core. When the liquid crystal compound has a plurality of aromatic rings of the above types, the aromatic rings may be of the same type or different type, and liked to each other or one another either directly or through a linking group having a carbon-carbon double bond or a carbon-carbon triple bond. Aromatic rings of 6π electron system include, for example, a benzene ring, a pyridine ring, a pyrimidine ring, a pyridazine ring, a pyrazine ring, and a tropolone ring. Aromatic rings of 10π electron system include, for example, a naphthalene ring, an azulene ring, a benzofuran ring, an indole ring, an indazole ring, a benzothiazole ring, a benzoxazole ring, a benzoimidazole ring, a quinoline ring, an isoquinoline ring, a quinazoline ring, and a quinoxaline ring. Aromatic rings of 14π electron system include, for example, a phenanthrene ring and an anthracene ring. According to a preferred embodiment of the present invention, the liquid crystal compound has biphenyl, benzothiazole, t-thiophene, or 2-phenylnaphthalene in the core. Among others, preferred is a liquid crystal compound having such a rod-like molecular structure that a 2-phenylnaphthalene ring is present in the core and the benzene ring and the naphthalene ring each have an optionally substituted alkyl, alkoxy or other group as a side chain. More preferably, the liquid crystal compound has a chiral portion in its any side chain and can develop ferroelectricity.

Figure 14:
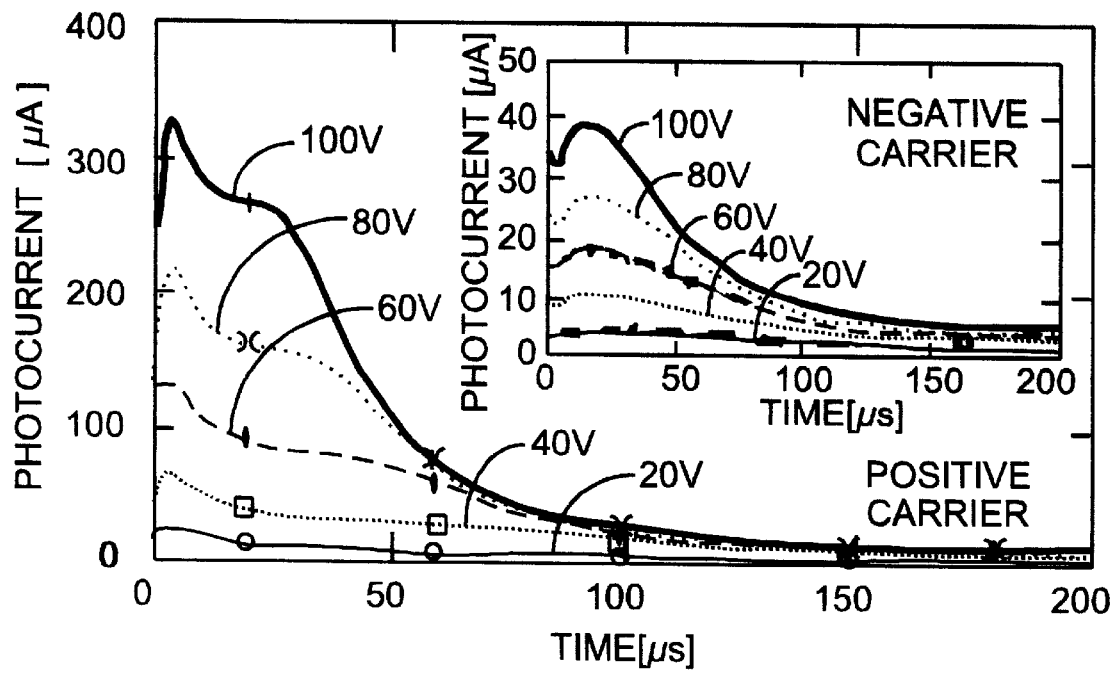
FIGS. 14 and 15 are diagrams showing charge-transport properties of the charge-transport material according to the present invention.
Figure 15:
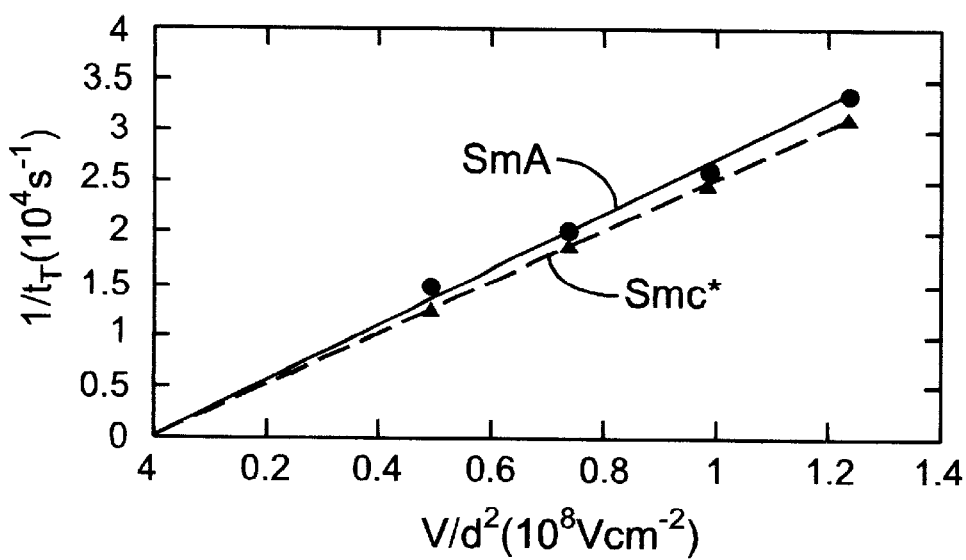

The ferroelectric charge-transport material may be a polymer liquid crystal containing the ferroelectric liquid crystal compound in its main chain and/or side chain. In the case of the polymer liquid crystal, in many cases, the molecular alignment in the molten state is fixed as it is even at a temperature below the melting point, leading to an advantage that the moldability and the film-forming properties can be imparted while maintaining high photoconductivity. A comparison of an SmC* phase with an SmA phase was made for the charge-transport properties of the ferroelectric liquid crystal according to the present invention. FIG. 14 is a graph showing a transient photocurrent waveform of the SmC* phase. FIG. 15 is a graph showing 1/τt, wherein τt represents the transit time of a carrier, as a function of V/d$^2$, wherein V represents the applied voltage and d represents the cell thickness, for positive carriers of the SmC* phase and the SmA phase. As is apparent from FIG. 15, V/d$^2$ is proportional to 1/τt, indicating that the mobility does not depend upon the applied voltage. The same results were obtained for negative carriers (not shown). Further, it is considered that the helix of the SmC* phase has been loosened by the applied voltage. The mobility of the SmC* phase, which is substantially the same as that of the SmA phase, suggests that there is no difference in charge-transport properties between the SmC (SmC*) phase and the SmA phase. That is, the above fact suggests that good carrier transport can be realized without influence of the difference in molecular alignment between the SmC phase and the SmA phase in the smectic phase on the mechanism of hopping conduction among carrier molecules.

The ferroelectric charge-transport liquid crystal material is useful for various applications including photosensors, electroluminescence devices, TFT devices, switching devices, photoconductors, image display devices, space modulating devices, thin-film transistors, and photorefractive devices.

The ferroelectric charge-transport liquid crystal material according to the present invention has high carrier mobility and can inhibit the formation of structural traps. Therefore, photosensors having high-speed response may be mentioned as the first application of the ferroelectric charge-transport liquid crystal material according to the present invention. In particular, since the ferroelectric charge-transport liquid crystal material has polarizing properties, the application thereof to photosensors having high-speed response, which can realize ON-OFF control by polarized light, is considered. Next, by virtue of excellent charge-transport properties, the ferroelectric charge-transport liquid crystal material can be used as a charge-transport layer in electroluminescence devices. Further, since the ferroelectric charge-transport-liquid crystal material has self-aligning properties, light emission is such that the emission intensity varies from direction to direction and the emitted light is like polarized light. The direction of the emission can be varied by varying the polarity of the electric field. Therefore, the ferroelectric charge-transport liquid crystal material can function also as an optical switch. Furthermore, since the electric field alignment and the photoconductivity can be simultaneously switched, the ferroelectric charge-transport liquid crystal material can be used in image display devices. This leads to the application of the ferroelectric charge-transport liquid crystal material to novel composite devices which have these functions in one device. In particular, utilization of two or more stable states of alignment in the ferroelectric liquid crystal material, which appear in the alignment mode and the applied voltage waveform, can realize the following applications of the ferroelectric charge-transport liquid crystal material according to the present invention.

1. Photosensors

For each of the stable states of alignment, in a comparison made based on even strength of applied electric field, a clear photocurrent signal can be obtained when the direction of the light absorption axis of liquid crystal molecules coincides with the direction of the plane of polarization of light applied for imparting photoconductivity. That is, photosensors can be realized that can select the plane of polarization of a optical signal to be detected through the utilization of polarity of the waveform of voltage applied to the device.

2. Light emitting devices for switching of a plane of polarization

Since the direction of alignment of the ferroelectric liquid crystal can be stably controlled by the polarity of the waveform of applied voltage, the plane of polarization in use as light emitting devices can be selectively controlled.

Figure 3A:
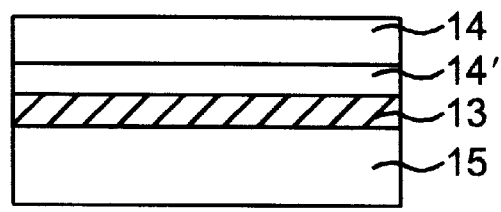
FIG. 3A is a schematic diagram of still another embodiment of the photosensor according to the present invention.
Figure 3B:
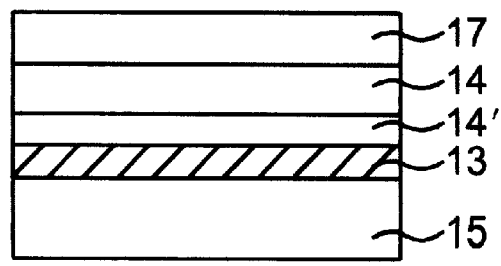
FIG. 3B is a schematic diagram of a further embodiment of the photosensor according to the present invention.

FIGS. 1, 2, 3A and 3B are explanatory views of representative embodiments of the application of the ferroelectric charge-transfer liquid crystal material according to the present invention to photosensors. The photosensors each comprise an electrode(s) 13, 13' and a charge-transport layer 14 formed of the ferroelectric charge-transport liquid crystal material according to the present invention. As shown in FIG. 3B, the photosensor may have a protective layer 17. A change in current values upon light irradiation can be utilized for applications of the ferroelectric charge-transport liquid crystal material to photosensors.

Figure 4:
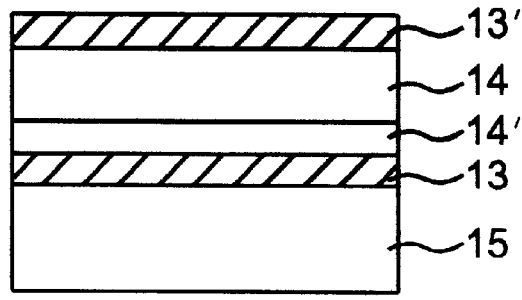
FIG. 4 is a schematic diagram of one embodiment of the image display device according to the present invention.

FIG. 4 is a schematic diagram illustrating a representative embodiment of the application of the ferroelectric charge-transport liquid crystal material to an image display device. The image display device comprises: a transparent substrate 15 of glass or the like; and, provided on the transparent substrate 15 in the following order, a transparent electrode 13 of ITO (indium tin oxide) or the like, a charge generation layer 14' capable of generating carriers in response to exposure, a charge-transport layer 14 formed of the ferroelectric charge-transport liquid crystal material according to the present invention, and a counter electrode (a gold electrode or the like) 13'. Upon imagewise exposure (input of an image) through the bottom of the device shown in the drawing, the ferroelectric charge-transport liquid crystal material is aligned in response to exposure, permitting carriers to flow through the counter electrode (gold electrode). The input image can be reproduced by optically reading the alignment of the liquid crystal.

Figure 5:
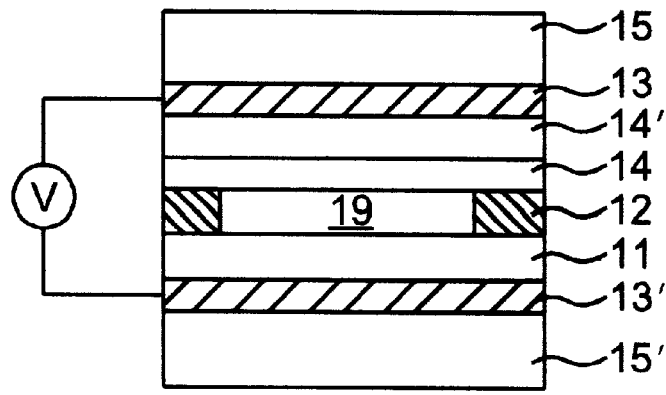
FIG. 5 is a schematic diagram of another embodiment of the image display device according to the present invention.

FIG. 5 is a schematic diagram illustrating an embodiment of the application of the ferroelectric charge-transport liquid crystal material according to the present invention to a charge-transport layer in an image recording device. As shown in FIG. 5, pattern exposure is carried out from the top of the device in the drawing while applying a voltage to upper and lower electrodes 13, 13'. In a charge generation layer 14', carriers are generated in a pattern form. The carriers transported by a charge-transport layer 14 are discharged in a space 19 and reach the surface of an image recording layer 11.

The image recording layer, for example, may be a liquid-crystal polymer composite layer formed of a composite comprising a ferroelectric liquid crystal and a polymer. The liquid crystal is aligned in a pattern form in an electric field by stored charges and stored, and can be optically read.

Figure 6:
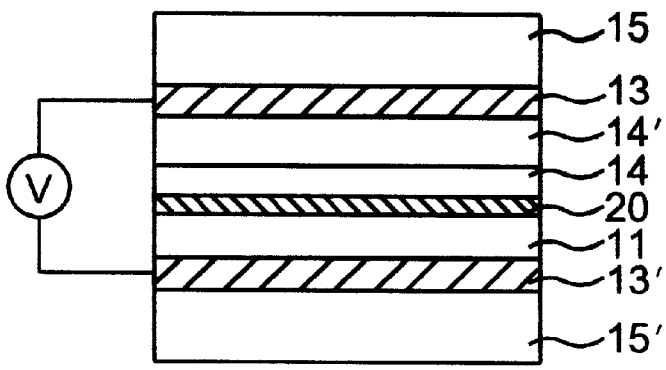
FIG. 6 is a schematic diagram of a further embodiment of the image display device according to the present invention.

FIG. 6 is a schematic diagram illustrating a further embodiment of the application of the ferroelectric charge-transport liquid crystal material to an image display device. As with the embodiment shown in FIG. 5, in the embodiment shown in FIG. 6, exposure is carried out while applying a voltage. Generated charges (image) are stored on the upper surface of a dielectric layer 20 and can be optically read.

Figure 7:
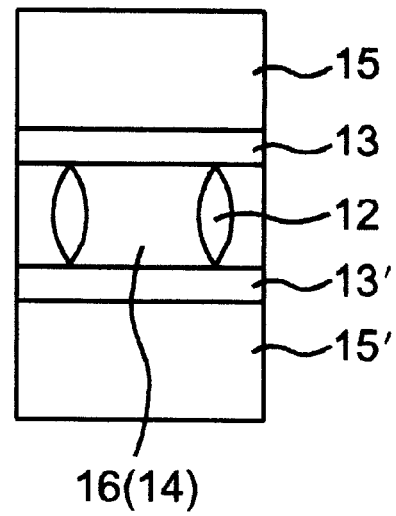
FIG. 7 is a schematic diagram of one embodiment of the electroluminescence device according to the present invention.
Figure 8:
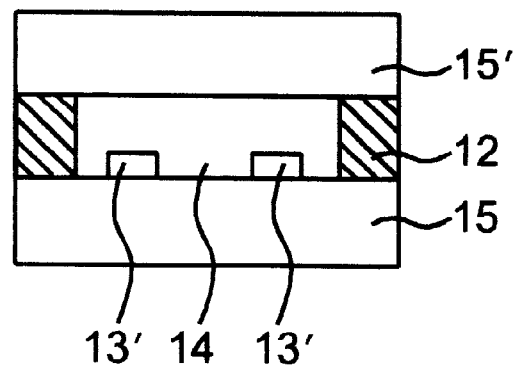
FIG. 8 is a schematic diagram of another embodiment of the electroluminescence device according to the present invention (provided with an electrode pattern)

FIGS. 7 to 10 are diagrams illustrating representative embodiments of the application of the ferroelectric charge-transport liquid crystal material according to the present invention to electroluminescence devices. The simplest structure of the electroluminescence device is as shown in FIG. 7. In this embodiment, a light-emitting layer 16 serves also as a charge-transport layer 14, and is sandwiched between a cathode and an anode. In this case, in order to provide intense light emission, preferably, the cathode material, which functions to inject electrons, has a small work function, while the anode material has a work function equal to or larger than the cathode material.

Anode materials usable herein include, for example, ITO, indium oxide, tin oxide (doped with antimony, arsenic, or fluorine), $Cd_2SnO_4$, zinc oxide, or copper iodide. Cathode materials usable herein include, for example, alkali metals and alkaline earth metals, for example, sodium, potassium, magnesium, and lithium, sodium-potassium alloy, magnesium-indium alloy, magnesium-silver alloy, aluminum, gold, silver, gallium, indium, and copper, and, in addition, the materials described above in connection with the anode material.

The material used in the light-emitting layer and the charge-transport layer comprises the charge-transport liquid crystal material of the present invention and a light-emitting material. Preferably, the charge-transport liquid crystal material is a material capable of transporting both an electron and a hole or a mixture of an electron-transport material with a hole-transport material. However, use of a material capable of transporting any one of the electron and the hole suffices for utilization of light emission at the electrode interface. When the liquid crystal per se is fluorescent, the light-emitting material is not particularly necessary. Many cases where the core of the liquid crystal comprises an organic dye compound having intense fluorescence in a solid state satisfy the above requirements.

Dye materials having high fluorescent quantum efficiency may be used as the light-emitting material, and examples thereof include laser oscillation dyes, such as diphenylethylene derivatives, triphenylamine derivatives, diaminocarbazole derivatives, bisstyryl derivatives, benzothiazole derivatives, benzoxazole derivatives, aromatic diamine derivatives, quinacridone compounds, perylene compounds, oxadiazole derivatives, coumarin compounds, anthraquinone derivatives, and DCM-1. The light-emitting material is added in such an amount as will not break the liquid crystallinity of the ferroelectric charge-transport liquid crystal material according to the present invention, preferably in an amount of about 0.01 to 30% by weight based on the ferroelectric charge-transport liquid crystal material according to the present invention.

Figure 9:
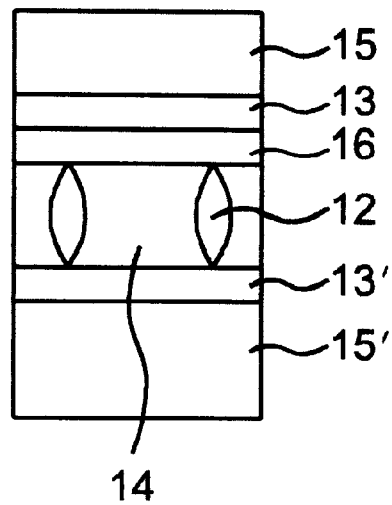
FIG. 9 is a schematic diagram of still another embodiment of the electroluminescence device according to the present invention.
Figure 10:
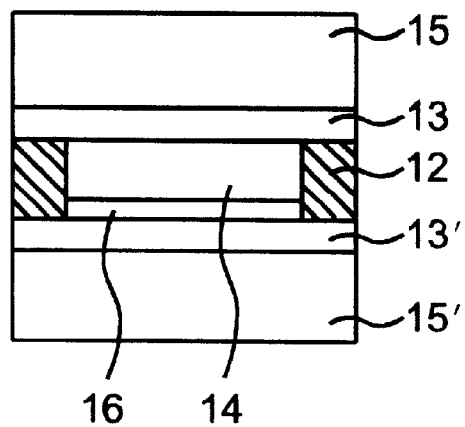
FIG. 10 is a schematic diagram of a further embodiment of the electroluminescence device according to the present invention.

In the case of the layer construction as shown in FIGS. 9 and 10, the thickness of the light-emitting layer 16 is such that the electron or hole transport is not inhibited. The thickness of the light-emitting layer is preferably 0.2 to 15 $\mu$m. The layer thickness may be regulated by incorporation of spacer particles in the material or by a sealing agent provided around the cell.

Figure 11:
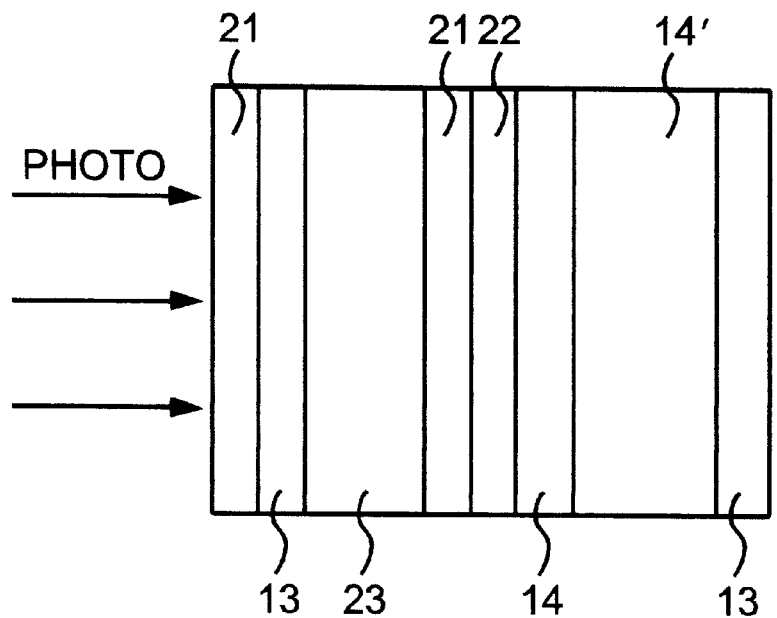
FIG. 11 is a schematic diagram of one embodiment of the space modulating device according to the present invention.
Figure 12:
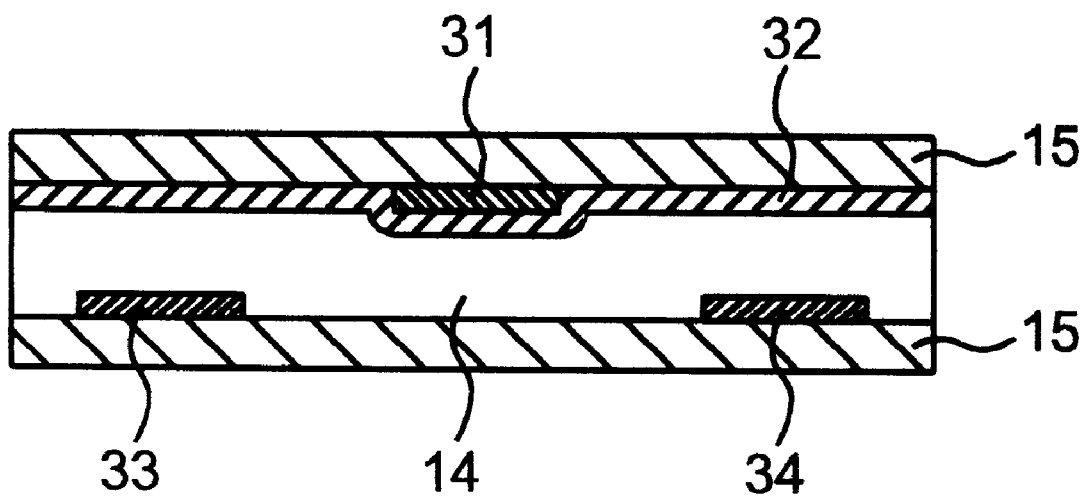
FIG. 12 is a schematic diagram of one embodiment of the thin-film transistor according to the present invention.
Figure 13:
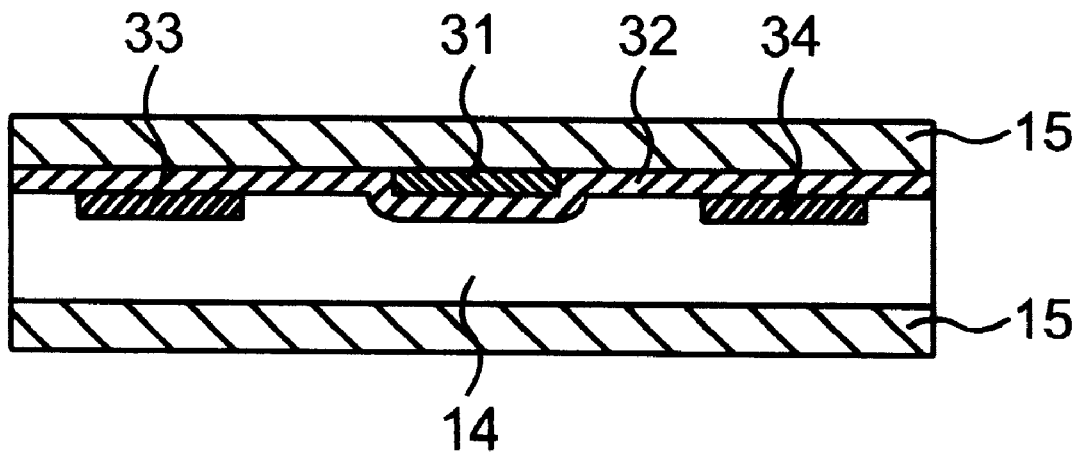
FIG. 13 is a schematic diagram of another embodiment of the thin-film transistor according to the present invention.

Further, the ferroelectric charge-transport liquid crystal material according to the present invention may be used in a space light modulating device as schematically shown in FIG. 11. Furthermore, the ferroelectric charge-transport liquid crystal material according to the present invention may also be used as an active layer in a thin-film transistor. For example, as shown in FIGS. 12 and 13, the liquid crystal material may be disposed on a substrate having thereon source, drain, and gate electrodes.

The following examples further illustrate the present invention, but are not intended to limit it.

EXAMPLE 1

Glass substrates each having an ITO electrode (surface resistivity: 100 to 200 $\Omega/\square$) formed by vacuum film formation were put on top of the other so that the ITO electrodes faced each other while providing a gap therebetween using spacer particles, thereby preparing a cell. A chiral naphthalene compound liquid crystal 2-[(S)-4-(6-methyloctyloxy)phenyl]-6-decylnaphthalene, crystal-54° C.-SmX-83° C.-SmC*-102° C.-SmA-112° C.-Iso., absorption spectrum peak in a $CH_2Cl_2$ solution: 262 nm, 295 nm, helical pitch 3.6 $\mu$m, spontaneous polarization Ps=0.6 $nC/cm^2$) was poured at 120° C. into the cell.

The time of flight in the SmX phase, the SmC* phase, and the SmA phase was carried out using a nitrogen laser beam at a wavelength of 337 nm as a light source. As a result, for both the hole and the electron, a clear nondispersive waveform could be obtained, and the occurrence of a photocurrent could be confirmed. In this case, regarding the SmX phase, the mobility was $1.1 \times 10^3$ $cm^2/Vs$ for both the hole and the electron; regarding the SmC* phase, the mobility was $2.5 \times 10^{-4}$ $cm^2/Vs$ for the hole and $2.4 \times 10^{-4}$ $cm^2/Vs$ for the electron; and, regarding the SmA phase, the mobility was $2.7 \times 10^{-4}$ $cm^2/Vs$ for the hole and $2.6 \times 10^{-4}$ $cm^2/Vs$ for the electron.

The chiral naphthalene compound liquid crystal described above was mixed with 1% by mole of a fluorescent dye ((3-(2-benzothiaolyl)-7-(diethylamino)-2H-1-benzopyran-2-one (manufactured by Nihon Kanko Shikiso Kenkyusho K.K.), oscillation wavelength range 507–585 nm). The mixture was poured into the same cell as described above (cell gap: about 2 $\mu$m) at 100° C. A d.c. electric field of 120 V was applied to the cell in a dark place. As a result, light emission derived from the fluorescent wavelength of the luminescent dye was observed.

EXAMPLE 2

A cell was prepared in the same manner as in Example 1. A chiral naphthalene compound liquid crystal (2-(4'-heptyloxyphenyl)-6-(6-methyl-1-octyloxy)naphthalene, crystal-74° C.-SmX-113° C.-SmC*-138° C.-SmA-142° C.-Iso.) was poured into the cell at 150° C.

The time of flight was carried out in the same manner as in Example 1. As a result, regarding the SmA phase and the SmC* phase, the mobility of the hole was $3 \times 10^{-4}$ $cm^2/Vs$, and regarding the SmX phase, the mobility of the hole was $2 \times 10^{-3}$ $cm^2/Vs$.

What is claimed is:

1. A ferroelectric charge-transport liquid crystal material comprising a liquid crystal compound having (1) a carrier mobility of not less than $10^{-5}$ $cm^2/Vs$, (2) a rod-like molecular structure with a 2-phenylnaphthalene ring present in the core and the benzene ring and the naphthalene ring in the 2-phenylnaphthalene ring each have an alkyl, alkoxy, or other group as a side chain, and (3) a chiral site in any side chain.

2. The liquid crystal material according to claim 1, which is in the form of a polymer liquid crystal having the liquid crystal compound in its main chain and/or side chain.

3. An image display device comprising a charge-transport layer formed of the material according to claim 1.

4. An electroluminescence device comprising a charge-transport layer formed of the material according to claim 1.

5. A photoconductor comprising a charge-transport layer formed of the material according to claim 1.

6. A space light modulating device comprising a charge-transport layer formed of the material according to claim 1.

7. A thin-film transistor comprising a charge-transport layer formed of the material according to claim 1.

8. A photosensor comprising a charge-transport layer formed of the material according to claim 1.

9. A photorefractive device comprising a charge-transport layer formed of the material according to claim 1.

10. The ferroelectric charge-transport liquid crystal material of claim 1, which is 2-[(S)-4-(6-methyloctyloxy)phenyl]6-decylnaphthalene.

11. The ferroelectric charge-transport liquid crystal material of claim 1, which is 2-(4'-heptyloxyphenyl)-6-(6-methyl-1-octyloxy) naphthalene.

* * * * *